United States Patent [19]

McKenna et al.

[11] 4,337,741

[45] Jul. 6, 1982

[54] ROTARY INTERNAL COMBUSTION ENGINE

[76] Inventors: Nicholas M. Q. McKenna; Peter J. Raven, both of 48 Pembroke Rd., Seven Kings, Ilford, Essex, England

[21] Appl. No.: 122,480

[22] Filed: Feb. 19, 1980

[30] Foreign Application Priority Data

Feb. 23, 1979 [GB] United Kingdom ................. 7906582

[51] Int. Cl.³ .............................................. F02B 53/00
[52] U.S. Cl. .................................................. 123/228
[58] Field of Search ........................ 123/228, 237, 244

[56] References Cited

U.S. PATENT DOCUMENTS

| 1,349,111 | 8/1920 | Suarez et al. | 123/228 |
| 1,968,729 | 7/1934 | Winsor et al. | 123/228 X |
| 2,170,366 | 8/1939 | Dominguez | 123/228 |
| 2,175,265 | 10/1939 | Johnson | 123/228 |
| 3,171,391 | 3/1965 | Appleton | 123/228 |
| 3,251,348 | 5/1966 | Unruh | 123/228 |

FOREIGN PATENT DOCUMENTS

| 172208 | 8/1952 | Austria | 123/228 |
| 116601 | 6/1918 | United Kingdom | 123/228 |

Primary Examiner—Michael Koczo, Jr.

Attorney, Agent, or Firm—Fleit & Jacobson

[57] ABSTRACT

A rotary internal combustion engine comprising a housing, a rotor-receiving chamber in the housing, a rotor which is mounted for rotation in the rotor-receiving chamber, at least five discrete combustion chambers which are separated by lobe portions of the rotor, and a valving arrangement for each lobe portion of the rotor, each valving arrangement being mounted in the housing and including an exhaust valve, a power/exhaust slide, a by-pass valve, an induction/compression slide, and an inlet valve, the power/exhaust slide being positioned between the exhaust valve and the by-pass valve, the by-pass valve being positioned between the power/exhaust slide and the induction/compression slide, and the induction/compression slide being positioned between the by-pass valve and the inlet valve, the by-pass valve allowing compressed gas to pass from the combustion chamber adjacent one side of a lobe portion to the combustion chamber adjacent the other side of the lobe portion whereby in use of the engine the compressed gas can be ignited when it has been by-passed to the combustion chamber on the said other side of the lobe portion to impart power to the periphery of the rotor substantially solely in the direction of rotation of the rotor.

9 Claims, 15 Drawing Figures

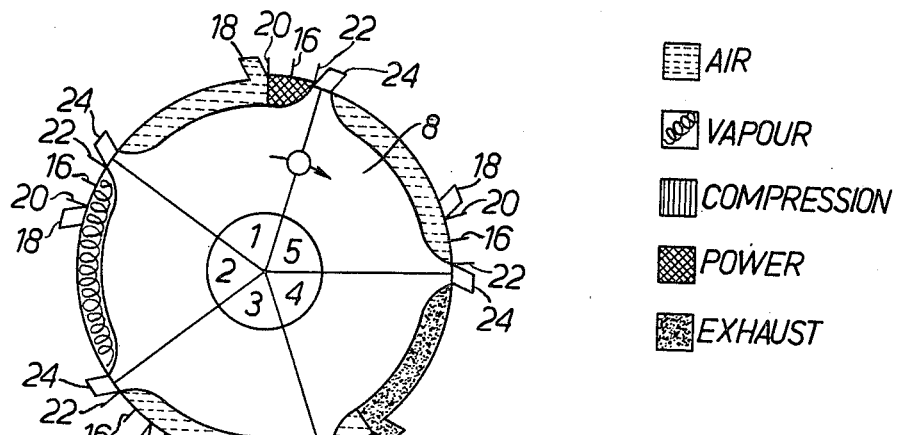
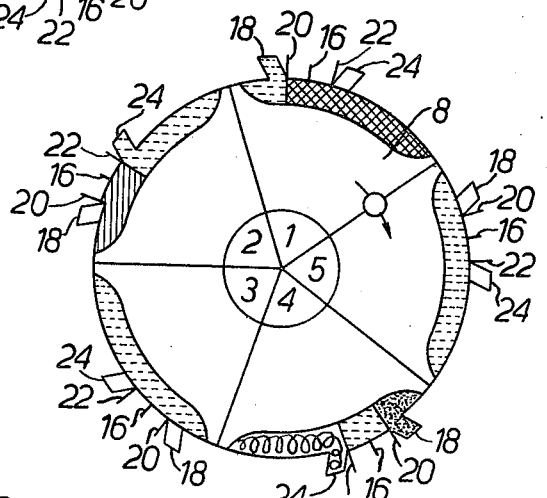
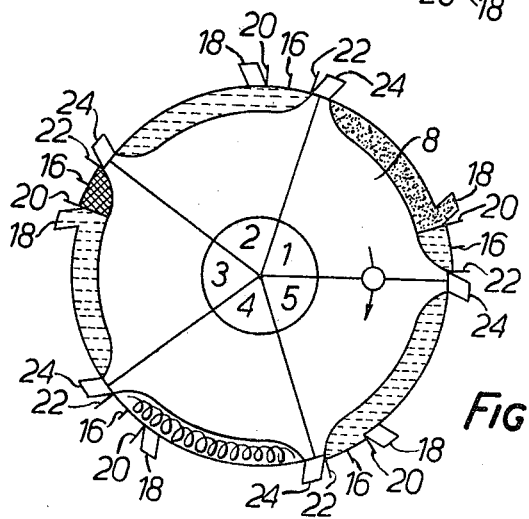

ROTARY INTERNAL COMBUSTION ENGINE

This invention relates to a rotary internal combustion engine.

It is well known that power is wasted in reciprocating piston internal combustion engines due to the fact that the pistons are repeatedly caused to be moved first one way and then the other and power is obviously consumed in continuously stopping and starting the pistons for each new piston stroke. Known rotary internal combustion engines also waste power in that the rotors of these engines tend to oscillate and again power is consumed by this oscillatory motion.

It is an aim of the present invention to provide a rotary internal combustion engine in which the power developed within the engine is applied to the periphery of the rotor and substantially solely in the direction of rotation of the rotor so that the rotor is continuously rotated in one direction without the application of forces tending to move it in the opposite direction.

Accordingly, this invention provides a rotary internal combustion engine comprising a housing, a rotor-receiving chamber in the housing, a rotor which is mounted for rotation in the rotor-receiving chamber, at least five discrete combustion chambers which are separated by lobe portions of the rotor, and a valving arrangement for each lobe portion of the rotor, each valving arrangement being mounted in the housing and including an exhaust valve, a power/exhaust slide, a by-pass valve, an induction/compression slide, and an inlet valve, the power/exhaust slide being positioned between the exhaust valve and the by-pass valve, the by-pass valve being positioned between the power/exhaust slide and the induction/compression slide, and the induction/compression slide being positioned between the by-pass valve and the inlet valve, the by-pass valve allowing compressed gas to pass from the combustion chamber adjacent one side of a lobe portion to the combustion chamber adjacent the other side of the lobe portion whereby in use of the engine the compressed gas can be ignited when it has been by-passed to the combustion chamber on the said other side of the lobe portion to impart power to the periphery of the rotor substantially solely in the direction of rotation of the rotor.

The rotary internal combustion engine of the present invention operates such that combustion of the compressed gas occurs in a predetermined sequence in the combustion chambers. The engine may be regarded as operating with induction, compression, ignition and exhaust sequences as employed in four stroke internal combustion engines but it also utilises air induction and air expulsion sequences during a complete rotation of the rotor. The reason for the air induction and air expulsion is to separate the individual gas flow operations and to maintain a continued and balanced progressive power generating cycle. This cycle requires that, at appropriate stages, certain chambers are free from any burnt or unburnt gases and in order to prevent a vacuum occuring in these chambers, the air is inducted and expelled.

Preferably, the by-pass means is a by-pass valve.

Each valving arrangement may comprise an exhaust valve, a power/exhaust slide, the by-pass valve, an induction/compression slide, and an inlet valve.

The by-pass valve preferably comprises a valve obturator operating in a cylinder. The cylinder is preferably formed in the housing.

The exhaust valve and the inlet valve may be each constituted by a valve obturator operating in a cylinder, the exhaust valve and the inlet valve being such that they are open when their valve obturators are farthest away from the rotor and closed when their valve obturators are nearest the rotor. The valve obturators advantageously form part of a wall defining the rotor-receiving chamber when the exhaust valve and the inlet valve are in their closed position.

The power/exhaust slide and the induction/compression slide may be plate members which are shaped to enter the combustion chambers and effect a seal therein. The plate members may have sealing members attached to their edges which are adjacent the rotor. The sealing members may be spring biased.

The lobe portions of the rotor may each have a flat wall portion for cooperating with the by-pass means. The engine of the invention may include sealing means for sealing the lobe portions of the rotor to a wall of the housing defining the rotor-receiving chamber. The sealing members may be spring biased.

Usually, the combustion chambers will be formed in the rotor although it is to be appreciated that the lobe portions could be formed as extensions of the rotor periphery rather than the preferred construction in which the combustion chambers extend inwardly of the rotor periphery.

Advantageously, the rotor is of an apertured construction. Such a construction enables the rotor to be lighter than when it is constructed to be solid. The rotor can however be of solid construction if desired.

Power take off from the engine of the invention is advantageously effected by means of a power take off shaft provided on the rotor.

The engine of the present invention may include a plurality of cammed surfaces for operating the valving arrangements. The operation of the cammed surfaces is advantageously controlled by the rotor.

The cammed surfaces may be constituted by a plurality of rings. There may be one ring for each element of the valving arrangement. The cam rings may be formed on a single cam member.

The cam rings will usually be adapted to rotate in the opposite direction to the direction of rotation of the rotor. The engine of the present invention may include a plurality of cogs positioned between the rotor and the cam rings for effecting the contra-rotating motion of the cam rings and the rotor.

The cammed surfaces may operate the valving arrangements through rocker arms. The rocker arms may be provided with idler wheels which run on the cammed surfaces.

The engine of the invention may include at least one O-ring seal on either side of the combustion chambers. The O-ring seals are preferably provided in the rotor although they may also be provided in the wall of the housing defining the rotor-receiving chamber.

Advantageously, the engine includes conduit means for allowing uncombusted air from the combustion chambers to be mixed with exhaust gases from the combustion chambers. Such an arrangement can be effective to give purer exhaust emissions than are obtainable without this mixture of the gases.

More than five combustion chambers and valving arrangements may be employed. Furthermore, in order to increase power, more than one rotor can be employed. Usually, an odd number of combustion chambers will be employed.

An embodiment of the invention will now be described solely by way of example and with reference to the accompanying drawings in which:

FIGS. 6 to 15 illustrate ten stages of operation in a cycle of the rotary internal combustion engine illustrated in FIG. 1.

Figure 1:
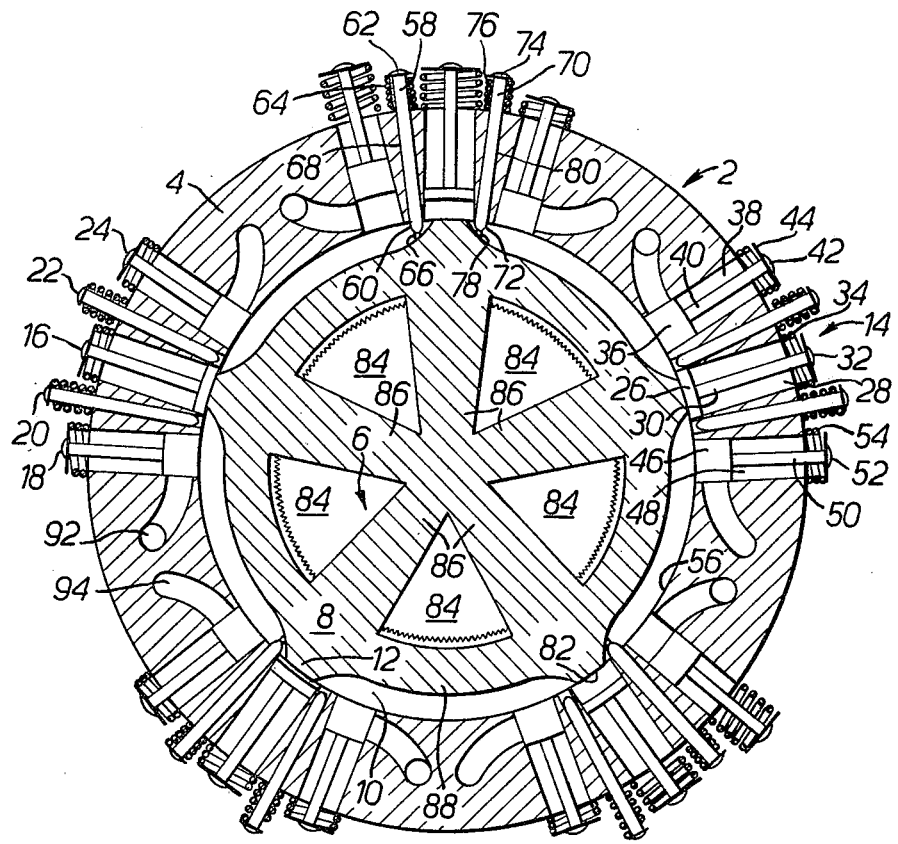
FIG. 1 is a sectional plan view of a rotary internal combustion engine in accordance with the invention taken from the inlet side of the engine.

Referring to FIGS. 1 to 5, there is shown a rotary internal combustion engine 2 comprising a housing 4, a rotor-receiving chamber 6 in the housing 4 and a rotor 8 which is mounted for rotation in the rotor-receiving chamber 6. The engine 2 further includes five discrete combustion chambers 10 which are formed in the rotor 8 and which are separated by five lobe portions 12 of the rotor 8.

The housing 4 is provided with five valving arrangements 14, there being one valving arrangement 14 for each lobe portion 12 of the rotor 8. Each valving arrangement 14 comprises by-pass means in the form of a by-pass valve 16. These by-pass valves 16 are for allowing compressed gas to pass from the adjacent combustion chamber 10 on one side of a predetermined lobe portion 12 to the adjacent combustion chamber 10 on the other side of the lobe portion 12 whereby in use of the engine 2, the compressed gas can be ignited when it has been by-passed to the combustion chamber 10 on the said other side of the lobe portion 12 to impart power to the periphery of the rotor 8 substantially solely in the direction of rotation of the rotor.

Each valving arrangement 14 comprises an exhaust valve 18, a power/exhaust slide 20, the by-pass valve 16, an induction/compression slide 22 and an inlet valve 24. As is shown most clearly in FIG. 1 the by-pass valve 16 comprises a valve obturator 26 which operates in a cylinder 28 formed in the housing 4. The obturator 26 is attached to a shank 30 which is provided with a head 32. A biasing spring 34 is provided around the shank 30 and it abuts against the housing 4 and the head 32 as shown.

The exhaust valve 18 comprises a valve obturator 36 which operates in a cylinder 38 formed in the housing 4. The obturator 36 is joined to shank 40 which has a head 42. A coil spring 44 is pivoted around the shank 40 and the spring 44 abuts against the housing 4 and the head 42 as shown. The inlet valve 24 is constructed similarly as the exhaust valve 18. Thus the inlet valve 24 comprises a valve obturator 46 which operates in a cylinder 48 formed in the housing 4. The obturator 46 is joined to a shank 50 which terminates in a head 52. A coil spring 54 is provided around the shank 50 and it abuts against the housing 4 and the head 52 as shown. The exhaust valve 18 and the inlet valve 24 are such that they are open when the obturators 36, 46 are farthest away from the rotor 8 and they are closed when the obturators 36, 46 are nearest the rotor 8. It will be seen from FIG. 1 that when the obturators 36, 46 are in their closed position, then they form part of a wall 56 of the housing 4, the wall 56 defining the rotor-receiving chamber 6.

The power/exhaust slide 20 is constituted by a plate member 58 which is curved at its innermost end 60 and which is provided with a head 62 at its other end. A coil spring 64 fits around the plate member 58 and abuts against the housing 4 and the head 62 as shown. The end 60 of the member 58 is provided with sealing means 66 which may be spring biased if desired. The sealing means may be profiled to suit the combustion chamber surface. The member 58 operates in a channel 68 formed in the housing 4. The housing 4 may be formed with an inwardly projecting flange (not shown) which extends into a peripheral groove (not shown) in the rotor to facilitate gas sealing and to avoid completely removing the power/exhaust slide 20 from the chamber 6 as the rotor lobe portions 12 rotate past the power/exhaust slide 20. The power/exhaust slide 20 may also be provided with side seals (not shown).

The induction/compression slide 22 is constructed similarly as the power/exhaust slide 20 and it thus comprises a plate member 70 having a curved end 72 and a head 74. A coil spring 76 fits around the member 70 and abuts against the housing 4 and the head 74. The inner end 72 of the member 70 is provided with sealing means 78 and the member 70 operates in a channel 80 formed in the housing 4.

The lobe portions 12 of the rotor 8 are each provided with a flat wall portion 82 for cooperating with the obturator 26 of the by-pass valve 16. The lobe portions 12 may be provided with sealing members (not shown) for sealing the lobe portions 12 of the rotor 8 to the wall 56 of the housing 4 defining the rotor-receiving chamber 6. These sealing members may be spring biased if desired.

Figure 2:
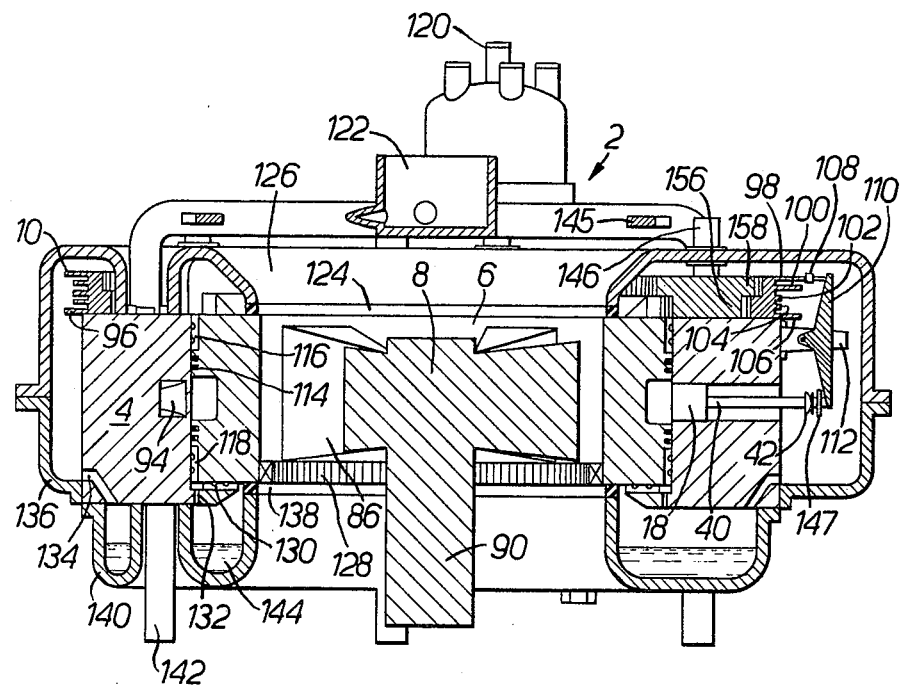
FIG. 2 is a sectional side view of the engine shown in FIG. 1.
Figure 3:
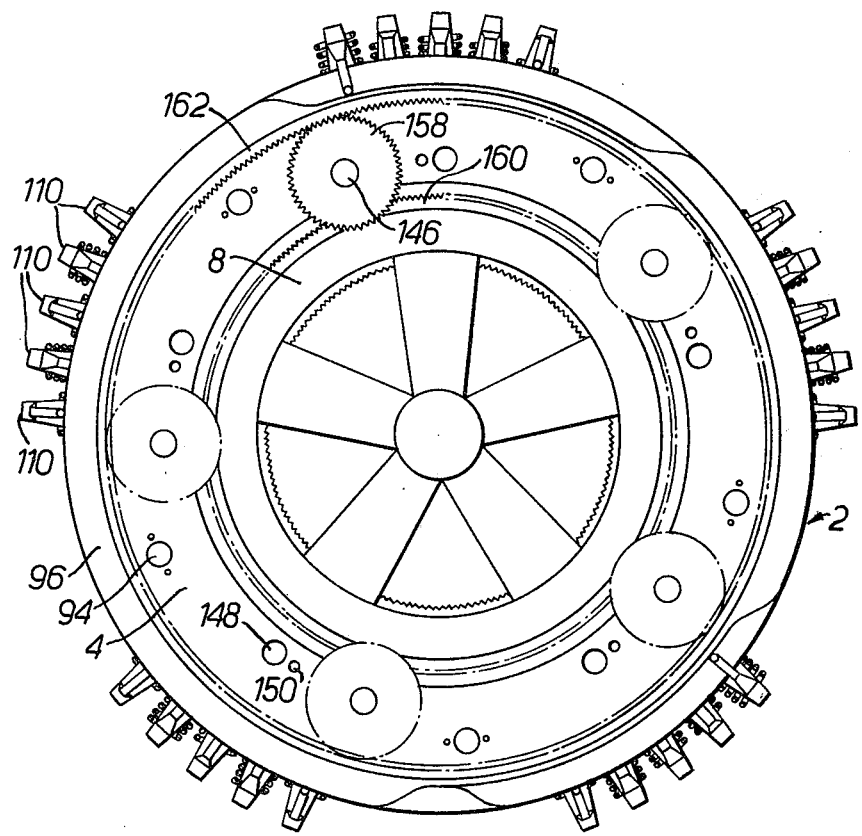
FIG. 3 is a plan view of the engine shown in FIG. 1 taken from the inlet side with covers and ancillaries removed.

As shown most clearly in FIG. 1, the rotor 8 is of apertured construction and is provided with triangular shaped apertures 84 which are defined by spoke members 86 supporting a continuous rotor body 88 at their outer ends. The rotor 8 is provided with a power take off shaft 90 as shown in FIG. 2.

The exhaust valve 18 is associated with an exhaust port 92 and the inlet valve 24 is associated with an inlet port 94. Gas is inducted and expelled through these ports at appropriate times by appropriate positioning of the obturators 36, 46. The timing or correct positioning of the obturators 36, 46 is effected by a circular cam member 96 which is provided with five rings 98, 100, 102, 104, 106. Each ring 98, 100, 102, 104, 106 has its profile traced by a cam ring tracing wheel 108 which is associated with a rocker member 110 which pivots about a rocker post 112. As the rocker member 110 pivots depending upon the position of the wheel 108 on the appropriate cam ring 98, 100, 102, 104, 106 then the appropriate valve is appropriately moved. In FIG. 2, a rocker member 110 is shown operating one of the exhaust valves 18.

Each of the five rings 98, 100, 102, 104, 106 will perform two independent valve operations during rotation. The exhaust ring will control the five valve movements associated with the expulsion of exhaust gases and the five valve movements associated with the expulsion of air. The inlet ring will control the five valve movements associated with the induction of petrol vapour and the five valve movements associated with the induction of air. The power/exhaust ring will control the five slide operations associated with the power stroke/air expulsion control and the five slide operations associated with the exhaust stroke/air trap control. The induction/compression ring will control the five slide operations associated with the air induction/gas compression control and the five slide operations associated with the vapour induction/air trap control. The by-pass valve ring will control the five valve movements associated with the compressed gas transfer and the five valve movements associated with the air trap transfer.

The profile of the by-pass ring has a gradual curvature due to the slow operational requirement of the valves, which open through 72° of rotation and close through a further 72° of rotation. The by-pass valves extract only a small power draw from the engine during operation and require a light pressure return spring.

The induction/compression and power/exhaust rings have a profile proportionately related to the rotor chambers. The slides follow the curvature of the chambers as required by the relevant stage of the cycle operation. A clearance is maintained between the slides and chambers and sealing is provided by spring-loaded seals between the two surfaces. Therefore, the profile and relative power draw figure is dependent on the selected curvature of the rotor chambers, and the angle at which the chamber construction commences in relation to the outer edge of the rotor.

The profile of the inlet and exhaust rings is similar to that of the slide rings, but varies slightly due to the advanced operation requirement of the valves prior to the entry of the slides into the chambers and the delayed closure after withdrawal of the slides from the chambers. The spring pressures and power draw figures for the inlet and exhaust valves will be similar to those for the induction/compression and power/exhaust valves. The timing overlap operation of the inlet and exhaust valves can occur without any effect to the adjacent gas flow operations. The unchambered areas of the rotor's periphery will give a valve timing allowance.

It will be seen from FIG. 2 that O-ring seals 114 are provided on the rotor 8 on either side of the combustion chamber 10. The rotor 8 runs in an upper rotor bearing 116 and a lower rotor bearing 118.

As shown in FIG. 2, the engine 2 is additionally provided with a distributor 120, an air inlet 122, an oil seal ring 124, and a top engine cover 126. Also provided are a starter ring 128, a rotor face bearing 130, a bearing oil return conduit 132, a cover oil return conduit 134, a side cover 136, a sump oil seal ring 138, a sump 140, and an exhaust manifold 142. The sump 140 is shown as containing sump oil 144. The engine 2 is further provided with an auxiliary mounting bracket 145 and a clearance adjustment device 147 for effecting the clearance of the rocker member 110 against the head 42 of the shank 40 of the exhaust valve 18. The engine 2 is still further provided with an auxiliary output drive member 146, a spark plug hole 148 for each combustion chamber, injector holes 150 and a reverse gear output 152 for driving auxiliaries such for example as an alternater, oil pump and injector controlling devices. Also provided on the engine 2 are manifold extension pieces 154 for mounting engine auxiliaries (not shown).

The rotor 8 is effective to drive a reverse gear 156. The cam member 96 is driven from reverse gears 158 which are shown most clearly in FIG. 3. As is seen from FIG. 3, the gears 158 operate between a reverse gear driving ring 160 and a cam driving ring 162.

Figure 5:
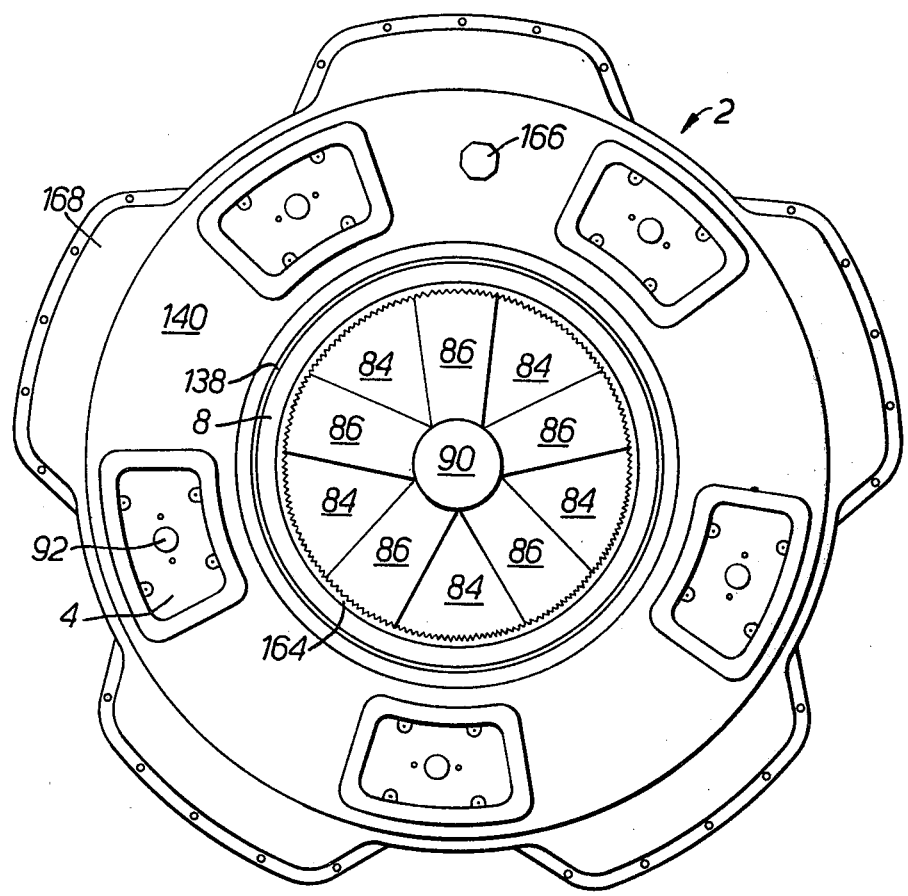
FIG. 5 is a plan view of the engine shown in FIG. 1 taken from the exhaust side with sump and covers fitted.

The engine 2 is started employing a starter ring 164 which can be seen most clearly in FIG. 5. Also illustrated in FIG. 5 are a sump drain plug 166 and a bottom cover 168 for the engine 2.

The precise operation of the engine 2 and the various positions of the valves in the valve arrangements 14 can be seen from FIGS. 6 to 15 which illustrate what happens over one revolution of the rotor 8. Rotation of the rotor 8 is indicated by the arrow shown on the rotor 8 and the various positions of the rotor 8 are shown by the numbers 1, 2, 3, 4, 5 shown at the centre of the rotor 8 as illustrated in FIGS. 6 to 15. Because the firing sequence is in the opposite direction to that in which the rotor 8 is turning, the valve operating mechanism will rotate anti-clockwise on a clockwise rotating rotor 8 and clockwise on an anti-clockwise rotating rotor 8.

Figure 9:
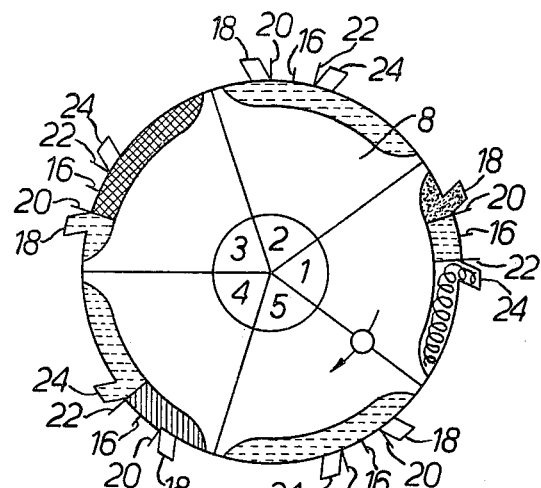

In FIG. 6, the combustion chamber 1 is shown under power from combustion between the power/exhaust slide 20 and the lobe portion 12. The power from the combustion forces the rotor 8 to the position shown in FIG. 7 in which more of the combustion chamber 1 is under power. FIG. 8 shows that the rotor 8 has been further rotated under the power from the combustion and that the chamber 1 is now exhausting gas through the exhaust valve 18, whilst the portion of the chamber 1 between the power/exhaust slide 20 and the lobe portion 12 is receiving induced air. FIG. 9 shows the rotor 8 in a slightly further advanced rotational position and in which the exhaust gases have nearly been exhausted, and vapour is being induced through the inlet valve 24. It will be noticed from FIG. 9 that air is trapped between the power/exhaust slide 20 and the induction/compression slide 22 and this air acts as an engine coolant.

Figure 10:
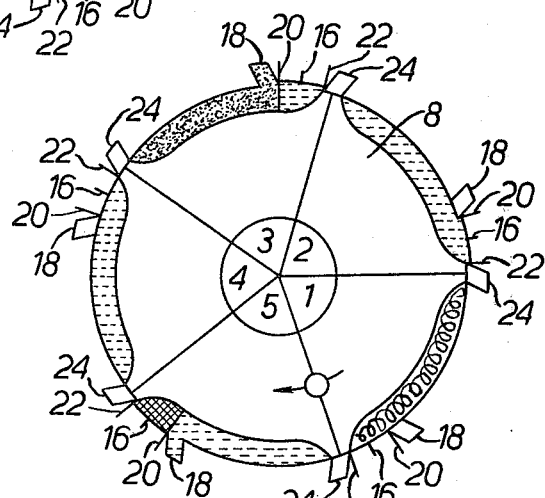
Figure 11:
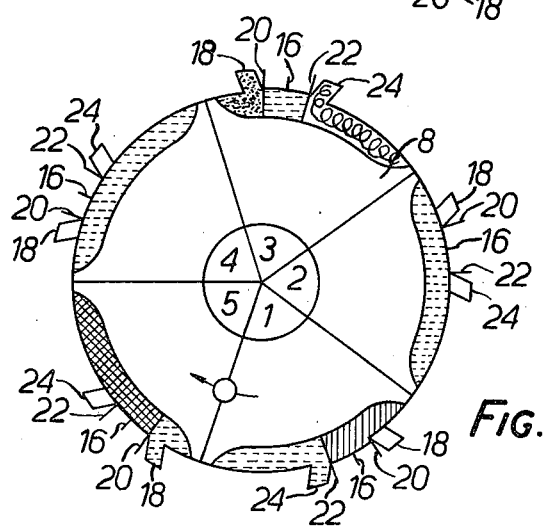

In FIG. 10, the rotor 8 has rotated further and the entire combustion chamber 1 is filled with the vapour. This vapour is then compressed as shown in FIG. 11 between the lobe portion 12 and the induction/compression slide 22, whilst air is induced through the inlet valve 24.

Figure 12:
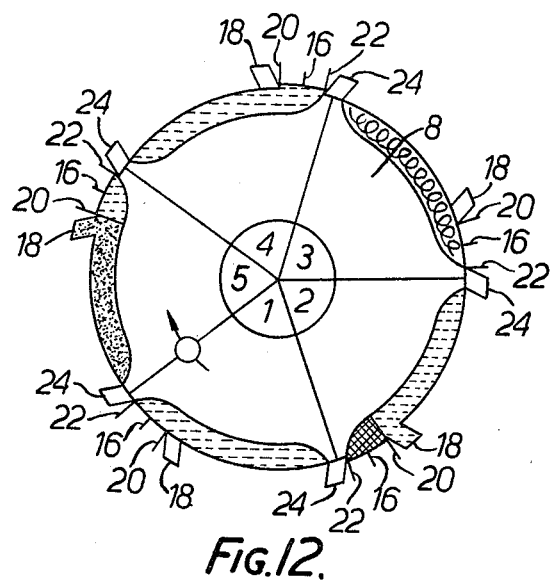
Figure 13:
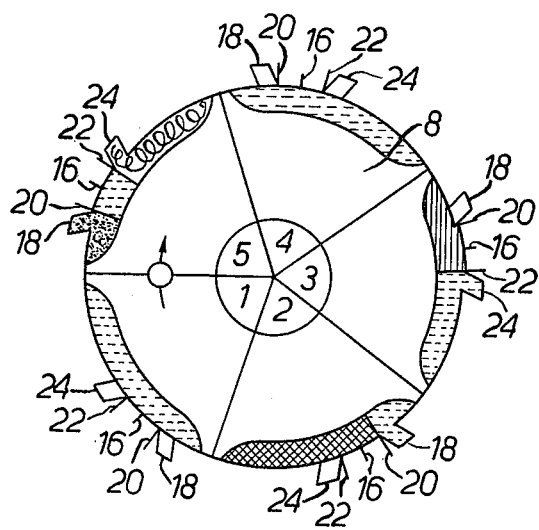
Figure 14:
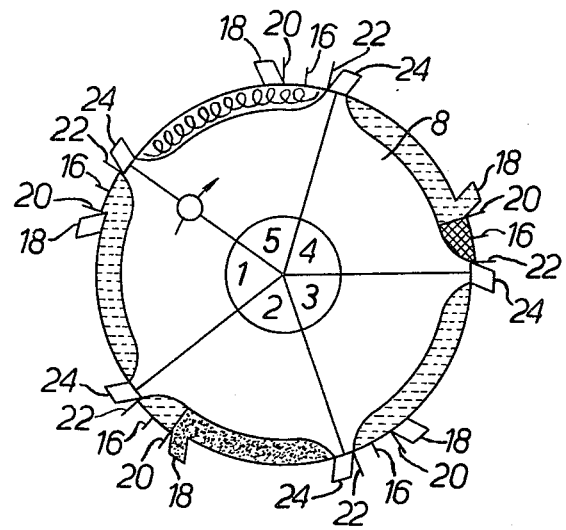
Figure 15:
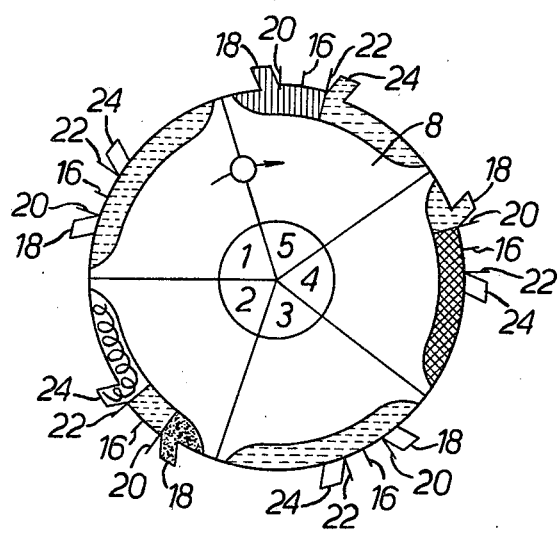

In FIG. 12, the entire combustion chamber 1 is shown filled with air. As the rotor 8 progresses to the position shown in FIGS. 13, 14 and 15, the combustion chamber 1 remains filled with air. The purpose of this air is to cool the combustion chamber 1. The combustion chamber 1 then progresses to the position shown in FIG. 6, in which expulsion of the air takes place between the lobe portion 12 and the power/exhaust slide 20 to complete the air cooling, and in which power from combustion starts is mentioned above.

It will be appreciated that the operation of the other combustion chambers 2 to 5 is the same but at different points in the rotation of the rotor 8. It will also be appreciated from FIGS. 6 to 15 that the timing sequence is in the opposite direction to the rotation of the rotor 8, i.e. the power section goes anti-clockwise as shown in FIGS. 6, 8, 10, 12 and 14.

The engine 2 operates by normal induction, compression, ignition and exhaust methods but it also utilises air induction and air expulsion during its rotation. The reason for the air induction and air expulsion is to separate the individual gas flow operations and to maintain the continuation and balance of the cycle of progression. This cycle requires, at stages, that certain combustion chambers 10 be free from any burnt or unburnt gases. In order to prevent a vacuum occuring in these combustion chambers 10, air is inducted and expelled. Although air induction and expulsion is employed, the engine 2 still involves five induction, compression, ignition and exhaust operations during a 360 degree cycle of rotation and it develops a very high power output regardless of the air flow involvement.

The induction and expulsion of the air may initially appear to waste power but in fact it can add advantages to the operation of the engine 2. Thus, for example, the combustion chamber 10 contained in the rotor 8 and the adjacent wall 56 will be cooled by the induction and expulsion of the air. More specifically, the air is not inducted and then expelled immediately after induction is complete. The air remains in the chamber into which it was inducted and it travels around the housing wall through a further 144° of rotation before being expelled. This not only saves continuous induction and expulsion of air but allows the air sufficient time to withdraw heat from the internal areas of the engine 2 before being expelled. Also, the air leaving the engine 2 can be combined with normal exhaust gases in the exhaust system, thereby burning the gases in the exhaust manifold and aiding in exhaust emission control. The cooling effect of the air may avoid the necessity of having additional cooling of the engine by the use of water. The control of the exhaust emission may remove the necessity for employing an air pump for emission control purposes.

The engine 2 may operate with types of induction, namely air and air/petrol induction. Thus it is advantageous to have a fuel injection system in which only one inlet valve is necessary. The fuel injectors are located at the air inlet of each chamber and they are arranged to operate only when a petrol/air mixture is required. At other stages air only will enter the chambers.

Although the engine 2 employs the normal induction, compression, ignition and exhaust cycles of an internal combustion engine, in the engine 2 the gas inducted and compressed within a combustion chamber 10 cannot be ignited and exhausted in the same combustion chamber 10 as otherwise the direction of power developed from the ignition of these gases would be opposed to the direction of rotation of the rotor 8. The by-pass valve 16 allows the ignition of the gases to be effected in the next following combustion chamber 10. The expanded gases are then exhausted from the combustion chamber 10. The engine 2 thus acts such that one combustion chamber 10 first acts as an induction/compression chamber to supply the following combustion chamber 10, then as a receiving chamber for ignition and exhaust of gases supplied from the preceding chamber. This ensures that each combustion chamber 10 carries out the operations of induction, compression, ignition and exhaust and that heat distribution throughout the engine 2 remains balanced. In a 360° rotation of the rotor 8, each ignition stroke of the engine 2 occurs at a different wall position of the housing 4. In the engine 2 illustrated in the accompanying drawings, the firing order is 1-3-5-2-4.

Power from the engine 2 can be taken directly from the shaft 90 and the power produced by the engine 2 is high due to the fact that the exploding gases act directly on the periphery of the rotor 8 and urge it only in one direction, i.e. the direction in which it is already moving in operation of the engine 2. The engine 2 thus operates efficiently under low compression and the fuel used may be of a less expensive nature. The abiliy of the engine 2 to operate under low compression reduces pressure and wear on various engine parts. The fact that the engine 2 fires five times one complete revolution of the rotor 8 with the rotor 8 being under power substantially all the time, enables the engine 2 to run powerfully at low speed revolutions of the rotor 8. With suitable gearing, the maximum engine revolutions per minute can be kept low.

When ignition takes place in the combustion chambers 10, the combustion force exerted on the various parts of the valving arrangements 14 may not be as high as would first appear. Due to the location of the output shaft 90 and the fact that the rotor 8 is always continuously rotating in one direction without any oscillating movement, the velocity of the rotor is maintained throughout the operation of the engine and only a small explosion in the combustion chambers 10 is required to achieve, maintain and increase the momentum of the rotor 8. This is in contrast to a conventional piston engine where the piston at top dead centre is actually stationary and, when ignition occurs, power is partially wasted due to the necessity of accelerating the piston rather than maintaining its speed.

In the engine 2 and due to the method induction and expulsion, the exhaust and induction strokers are 100% complete. This means that the inducted vapour will contain no expelled exhaust gases from a previous stroke as may be encountered in a known piston engine.

The sequence of valve and slide operations in the valving arrangements 14 will be progressively the same at each of the five firing points round the rotor housing 4. This sequence will, due to the gas flow, be in the opposite direction to the direction of rotation of the rotor 8. It is for this reason that the actuating cam member 96 is arranged to rotate in the opposite direction to that of the rotor 8.

Advancing of the ignition spark in relation to the speed of rotation of the rotor 8 can range through the distance moved by the rotor 8 whilst the compressed gases are transferring through the by-pass valve 16. The flat portions 82 on the rotor lobe portions 12 allow for advance operation of the valve. The time allowed for advanced opening and closing of the valves can be extended or reduced by varying the length of the portions 82. In certain operations of the 360 degree cycle of the engine 2, advanced valve timing is unrestricted because the previous operation will not interfere with the following operation. The portions 82 are sufficient to allow adequate advance valve operation because of their length in relation to the length of the combustion chambers 10 and the fact that high revolutions per minute from the engine 2 are not required.

In the engine 2, the sparking plugs are located in the by-pass wall of the housing 4 and in contact with the combustion chamber gases when the by-pass valves 16 are open. The fuel injectors, as indicated above, are advantageously located in the inlet valve 24.

The slides 20, 22 are sealed on three edges and oil lubrication into the channels 68, 80 is through the slides and out between the seals. The oil supply is arranged to be automatically cut off when the slides 20, 22 withdraw. This may be effected by a roller bearing positioned in an oil conduit in the slides 20, 22.

In addition to the illustrated oil return passageways 132, 134, oil can lubricate the engine 2 by other oil ways and various jets as and where desired. The sump oil 144 can be drawn from the sump 140 by an oil pump driven from the reverse gear 158.

Figure 4:
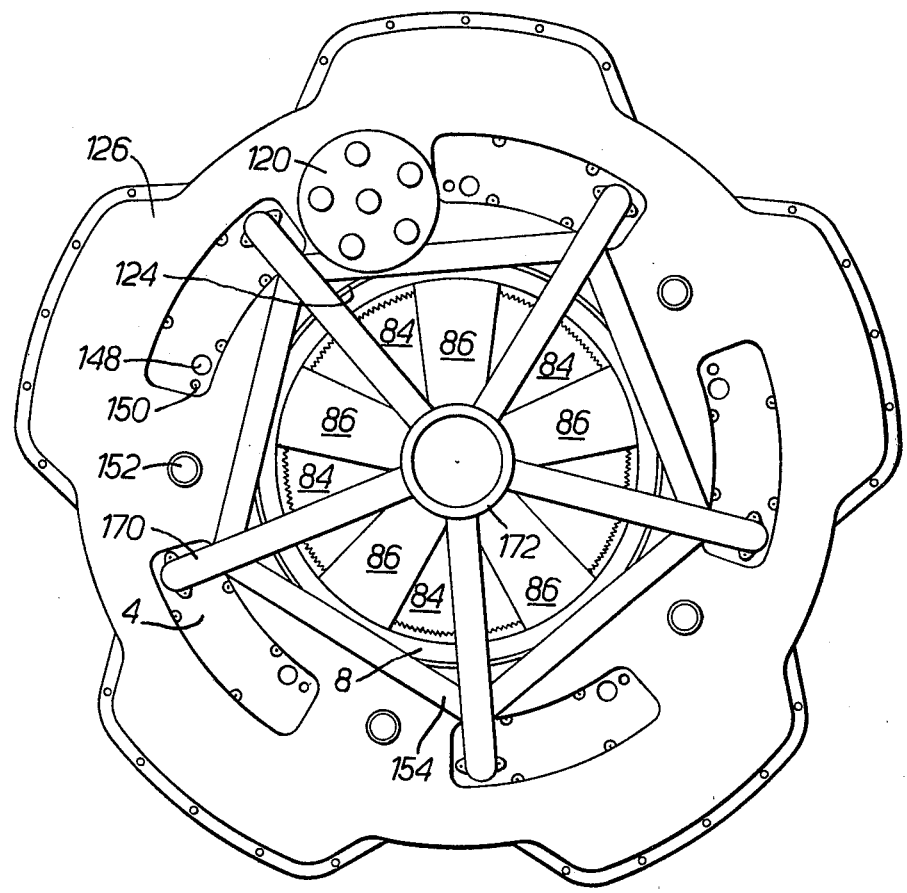
FIG. 4 is a plan view of the engine shown in FIG. 1 taken from the inlet side with covers and inlet fitted.

Referring to FIG. 4, it will be seen that air inlet manifolding 170 is interconnected to a central single filtered inlet 172 which may contain a throttle control.

The distributor 120 may be driven from the reverse gear 156 and it may have a single cam operating contact breakers five times per rotation of the rotor 8. The engine 2 can have alternator and starter motor drives also connected to drives from the reverse gear 156.

The profile of the rings of the cam member 96 that operate the slides 20, 22 are an accurate representation of the path of the movement of the slides 20, 22 and a constant clearance is ensured between the slides 20, 22 and the surface of the rotor 8. The clearance gap may be gas sealed by spring loaded seals.

In the engine 2, the injector distributor and the control unit may take their drive from the inner edge of the rotor 8.

The engine 2 illustrated in the drawings is shown in the position in which it would be if it were mounted in a horizontal position. Since the engine 2 is already compact, its height can be considerably reduced by mounting it horizontally. By way of example, it is mentioned that the maximum height of the engine 2 may be approximately 8 inches. With such mounting the shaft 90 can be splined and it can then slide directly into a gear box mounted therebelow. The output drive from the gearbox can be then taken directly to the wheels of a vehicle. The engine 2 can easily be located in either the front or the rear of a vehicle and removal and refitting of an engine can merely involve a simple lift-out-lower-in operation to and from the gear box. It is to be appreciated however that if desired, the engine 2 can be mounted in a vertical position with little variation in its basic construction.

The engine 2 can be adapted to operate from normal carburation or fuel injection, by altering the inlet valves 24. If a carburetor is used, provision must be made for an air inlet and a petrol/air inlet. When fuel injection is used, only an air inlet is required.

In the engine 2 as described above, there has been shown for simplicity a single rotor 8 operating with five combustion chambers 10, appropriate ignition being effected by electronic ignition of compressed petrol vapour supplied through a fuel injection system. The engine 2 can be arranged to operate from various combustible liquids and gases including diesel fuel and the above mentioned petrol. The required output from the engine 2 can be achieved by altering the diameter and width of the rotor 2 and also the capacity of the combustion chambers 10. If desired, several rotors 8 can be combined or connected together for obtaining a higher power output. The rotors could be offset with respect to each other to achieve an ignition overlap. In addition, for a higher power output more than five combustion chambers can be utilised although it has presently been found that at least five combustion chambers 10 are desirable in order to produce a good power balance, equalised heat distribution and maintenance of continuity of gas flow throughout the rotation of the rotor 8. Generally, a variation in engine capacity, per rotor, can be achieved by increasing or decreasing the diameter of the rotor, the number of combustion chambers per rotor, the curvature of the combustion chambers, the width and depth of the combustion chambers, and the length of the rotor lobes.

The engine 2 of the present invention can be utilised in many different situations. It can thus be used to power motor vehicles, aircraft and ships and it can also be employed for providing power in stationary modes.

It is to be appreciated that the embodiment of the invention described above has been given by way of example only and that alternative constructions may be employed. Thus, for example, the number and shape of the combustion chambers 10 illustrated above can be varied and screw means can be provided for allowing induction cooling of the engine 2.

Fuel for the engine 2 may also be provided by carburettors, with consequent inlet port modifications being required to provide an air inlet port and a petrol vapour inlet port. The fuel for the engine 2 is preferably petrol but other fuels may be used including both liquids and gases. If the engine 2 is built to withstand the generated high pressures, the fuel may be ignited by compression rather than by the sparking plugs. The engine 2 can operate on supercharging or turbocharging. The induction/compression and the ignition/exhaust slides can be wedge shaped rather than rectangular if desired. Furthermore, if desired, the various parts of the valving arrangements 14 could be operated from a cammed member inside the housing 4 instead of outside the housing 4 as is illustrated in the drawings. Connecting rods could then pass from the cammed member to the valving arrangements.

We claim:

1. A rotary internal combustion engine comprising a housing, a rotor-receiving chamber in the housing, a rotor which is mounted for rotation in the rotor-receiving chamber, at least five discrete combustion chambers which are separated by lobe portions of the rotor, and a valving arrangement for each lobe portion of the rotor, each valving arrangement being mounted in the housing and including an exhaust valve, a power/exhaust slide, a by-pass valve, an induction/compression slide and an inlet valve, the power/exhaust slide being positioned between the exhaust valve and the by-pass valve, the by-pass valve being positioned between the power/exhaust slide and the induction/compression slide, and the induction/compression slide being positioned between the by-pass valve and the inlet valve, the by-pass valve allowing compressed gas to pass from the combustion chamber adjacent one side of a lobe portion to the combustion chamber adjacent the other side of the lobe portion whereby in use of the engine the compressed gas can be ignited when it has been by-passed to the combustion chamber on the said other side of the lobe portion to impart power to the periphery of the rotor substantially solely in the direction of rotation of the rotor.

2. A rotary internal combution engine according to claim 1 in which the by-pass valve comprises a valve obturator operating in a cylinder, the cylinder being formed in the housing, and the valve obturator forming part of a wall defining the rotor-receiving chamber when the valve obturator is in its closed position.

3. A rotary internal combustion engine according to claim 1, or claim 2 in which the exhaust valve and the inlet valve are each constituted by a valve obturator operating in a cylinder, the exhaust valve and the inlet valve being such that they are open when their valve obturators are farthest away from the rotor and closed when their valve obturators are nearest the rotor.

4. A rotary internal combustion engine according to claim 1 or claim 2 in which the power/exhaust slide and the induction/compression slide are plate members which are shaped to enter the combustion chambers and effect a seal therein.

5. A rotary internal combustion engine according to claim 1 or claim 2 in which the lobe portions of the rotor each have a flat wall portion for being engaged by the by-pass valve, and in which the engine includes sealing means for sealing the lobe portions of the rotor to a wall of the housing defining the rotor-receiving chamber.

6. A rotary internal combustion engine according to claim 1 or claim 2 in which the combustion chambers are formed in the rotor, and in which the rotor is of an apertured construction.

7. A rotary internal combustion engine according to claim 1 or claim 2 including a plurality of cammed surfaces for operating the valving arrangements, the position of the cammed surfaces being controlled by the rotor.

8. A rotary internal combustion engine according to claim 1 or claim 2 in which the cammed surfaces operate the valving arrangements through rocker arms, the rocker arms being provided with idler wheels which run on the cammed surfaces, and in which the engine includes at least one O-ring seal on either side of the combustion chambers, the O-ring seals being provided in the rotor.

9. A rotary internal combustion engine according to claim 1 or claim 2 having an odd number of (five) combustion chambers (and five valving arrangements).

* * * * *